(12) United States Patent
Yu

(10) Patent No.: US 8,694,318 B2
(45) Date of Patent: Apr. 8, 2014

(54) METHODS, SYSTEMS, AND PRODUCTS FOR INDEXING CONTENT

(75) Inventor: Ke Yu, Alpharetta, GA (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 1671 days.

(21) Appl. No.: 11/523,413

(22) Filed: Sep. 19, 2006

(65) Prior Publication Data
US 2008/0071542 A1    Mar. 20, 2008

(51) Int. Cl.
*G10L 15/00* (2013.01)

(52) U.S. Cl.
USPC .............. 704/254; 704/251; 707/999.003

(58) Field of Classification Search
USPC ............ 704/254, 270, 267, 275, 260, 231; 352/5; 707/104.1, 102, 3
See application file for complete search history.

(56) References Cited

U.S. PATENT DOCUMENTS

| | | | |
|---|---|---|---|
| 5,680,511 A * | 10/1997 | Baker et al. | 704/257 |
| 5,734,794 A * | 3/1998 | White | 704/275 |
| 5,867,816 A * | 2/1999 | Nussbaum | 704/232 |
| 6,076,056 A | 6/2000 | Huang et al. | |
| 6,243,713 B1 * | 6/2001 | Nelson et al. | 1/1 |
| 6,408,270 B1 | 6/2002 | Garber | |
| 6,615,174 B1 * | 9/2003 | Arslan et al. | 704/270 |
| 6,760,704 B1 * | 7/2004 | Bennett | 704/270 |
| 6,873,993 B2 * | 3/2005 | Charlesworth et al. | 707/740 |
| 6,882,970 B1 * | 4/2005 | Garner et al. | 704/236 |
| 6,990,448 B2 | 1/2006 | Charlesworth et al. | |
| 7,010,483 B2 | 3/2006 | Rajan | |
| 7,054,812 B2 | 5/2006 | Charlesworth et al. | |
| 7,257,533 B2 * | 8/2007 | Charlesworth et al. | 704/249 |
| 7,286,987 B2 * | 10/2007 | Roy | 704/270 |
| 7,386,217 B2 * | 6/2008 | Zhang | 386/248 |
| 7,467,087 B1 * | 12/2008 | Gillick et al. | 704/260 |
| 8,005,827 B2 * | 8/2011 | Fassett et al. | 707/726 |
| 2002/0097380 A1 * | 7/2002 | Moulton et al. | 352/5 |
| 2003/0112265 A1 * | 6/2003 | Zhang | 345/723 |
| 2004/0210443 A1 * | 10/2004 | Kuhn et al. | 704/276 |
| 2004/0215449 A1 | 10/2004 | Roy | |
| 2006/0015339 A1 | 1/2006 | Charlesworth et al. | |
| 2006/0020463 A1 * | 1/2006 | Reich | 704/257 |
| 2006/0053101 A1 | 3/2006 | Stuart et al. | |
| 2006/0053107 A1 | 3/2006 | Stuart | |
| 2006/0167690 A1 * | 7/2006 | Sato | 704/249 |
| 2006/0206324 A1 * | 9/2006 | Skilling et al. | 704/231 |
| 2006/0218191 A1 * | 9/2006 | Gopalakrishnan | 707/104.1 |
| 2007/0174055 A1 * | 7/2007 | Chengalvarayan et al. | 704/251 |
| 2007/0208569 A1 * | 9/2007 | Subramanian et al. | 704/270 |
| 2008/0033723 A1 * | 2/2008 | Jang et al. | 704/254 |
| 2008/0040323 A1 * | 2/2008 | Joshi | 707/3 |

* cited by examiner

*Primary Examiner* — Douglas Godbold
*Assistant Examiner* — Mark Villena
(74) *Attorney, Agent, or Firm* — Scott P. Zimmerman, PLLC

(57) ABSTRACT

Methods, systems, and products index content. An audio stream is converted to a stream of phonemes. The stream of phonemes is filtered according to a list of popular phoneme strings. A weighting is computed for the content based on at least one popular phoneme combination occurring in the stream of phonemes. The content is indexed based on the weighting.

17 Claims, 9 Drawing Sheets

METHODS, SYSTEMS, AND PRODUCTS FOR INDEXING CONTENT

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

The exemplary embodiments generally relate to data processing and, more particularly, to speech processing.

Content storage and retrieval needs improvement. When content is searched, conventional techniques perform a speech-to-text conversion. That is, the voice or audio portion of content is first converted to text, and then that text is searched for the occurrences of a textual query. Speech-to-text conversion, however, is slow and complex, thus requiring much computer processing. When even a small video library must be searched, the conventional speech-to-text conversion techniques may require hours of server processing. As more and more content gets posted to the Internet, the conventional speech-to-text conversion techniques are not practical for searching large content libraries. What is needed, then, are methods, systems, and products for searching and indexing content that do not require a slow and complex speech-to-text conversion.

SUMMARY

The exemplary embodiments provide methods, systems, and products for indexing content. No matter what type of content is being searched, exemplary embodiments describe how that content may be searched and retrieved without performing a slow and complex speech-to-text conversion. Exemplary embodiments permit audio and audiovisual content (e.g., music, movies, and games) to be searched based only on their audio content. That is, the content can be searched, indexed, and/or retrieved, based only on an analysis of its audio content. A movie, for example, can be searched and indexed, based only on an analysis of the voice track, without converting the spoken words to text. Exemplary embodiments determine the occurrences of popular words (or their phoneme equivalents) within the audio portion of content. If the popular words (or a popular combination of phonemes) occur within the audio portion of the content, then the content may be searched, indexed, and sorted, based on those occurrences. Unlike conventional schemes for indexing movies, video, and other content, exemplary embodiments need not utilize speech recognition to convert spoken words into text. Here, only the phonetic content of the voice track (or any other audio portion) is analyzed to determine whether a movie, music, game, or other content matches a query. These concepts thus reduce, or even eliminate, the slow and complex speech-to-text conversion that occurs in conventional techniques for searching content.

Exemplary embodiments include a method for indexing content. An audio stream is converted to a stream of phonemes. The stream of phonemes is filtered according to a list of popular phoneme strings. A weighting is computed for the content based on at least one popular phoneme combination occurring in the stream of phonemes. The content is indexed based on the weighting.

More exemplary embodiments include a system of indexing content. The system includes an indexing application stored in memory, and a processor communicates with the memory. The indexing application instructs the processor to convert an audio stream to a stream of phonemes and filter the stream of phonemes according to a list of popular phoneme strings. The indexing application also instructs the processor to compute a weighting for the content based on at least one popular phoneme combination occurring in the stream of phonemes and to index the content based on the weighting.

Other exemplary embodiments describe a computer program product for indexing content. This computer program product comprises a computer-readable media or medium with computer-readable instructions for converting an audio stream to a stream of phonemes. The stream of phonemes is filtered according to a list of popular phoneme strings. A weighting is computed for the content based on at least one popular phoneme combination occurring in the stream of phonemes. The content is indexed based on the weighting.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
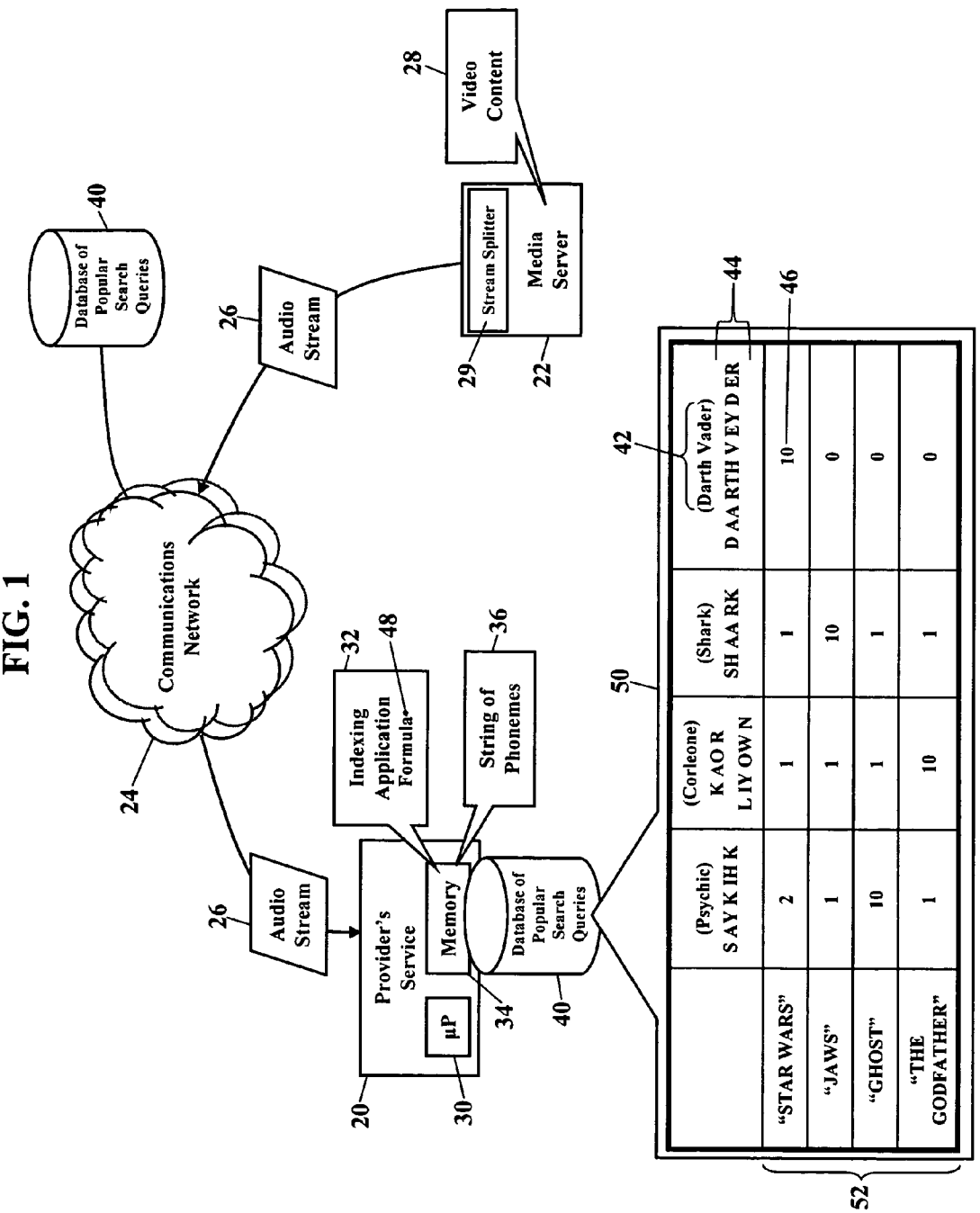
FIG. 1 is a schematic illustrating a network environment in which exemplary embodiments may be implemented.

FIG. 1 is a schematic illustrating a network environment in which exemplary embodiments may be implemented. A service or content provider's server 20 communicates with a media server 22 via a communications network 24. The provider's server 22 receives an audio stream 26 from the media server 22. The audio stream 26 may comprise music or any audio file or even data. The audio stream 26 may additionally or alternatively comprise an audio portion of video content 28 stored in the media server 22. If the video content 28 is a movie, then the audio stream 26 may be the soundtrack to that movie. The audio stream 26 may even comprise analog content that has been, or will be, digitally converted to a signal (such as by an analog-to-digital converter). The video content 28 may be processed by a stream splitter 29 that produces or separates the audio stream 26. Whatever the audio stream 26 may be, the provider's server 22 processes and indexes the audio stream 26. The provider's server 20 has a processor 30 (e.g., "µP"), application specific integrated circuit (ASIC), or other similar device that executes an indexing application 32 stored in memory 34. The indexing application 32 is a software engine or computer program that indexes the video content 28, based on the audio stream 26. That is, the video content 28 may be stored, indexed, searched, and retrieved, based only on the audio stream 26, as the following paragraphs will explain.

The indexing application 32 processes the audio stream 26. The indexing application 32 instructs the processor 30 to convert the audio stream 26 to a string 36 of phonemes, as is known. The processor 32 stores the string 36 of phonemes in the memory 34. The processor 30 then compares the string 36 of phonemes to a database 40 of popular search queries. The database 40 of popular search queries may be locally stored in the memory 34 of the provider's server 20, or the database 40 of popular search queries may be remotely accessible via the communications network 24. As users or subscribers make search queries for content, the database 40 of popular search queries tracks, tallies, and/or stores those query words and/or phrases that are most popularly requested. As FIG. 1 illustrates, the database 40 of popular search queries maps, indexes, or otherwise associates popular query terms 42 to their corresponding string 44 of phonemes. As a population of users and/or subscribers makes queries for content, the database 40 of popular search queries maintains a tally or count of those queries. The most popular queries are then mapped to their corresponding phoneme strings. The database 40 of popular search queries, for example, may store the ten most-requested queries or the one hundred most-requested queries—any number, in fact, depending on the allocated size of the database 40. The processor 32 accesses the database 40 of popular search queries and/or retrieves one, some, or all of the popular strings 44 of phonemes. The processor 32 then filters or inspects the string 36 of phonemes for any occurrence of the popular strings 44 of phonemes.

The string 36 of phonemes may be weighted and indexed. As FIG. 1 also illustrates, each popular query term 42, and thus the corresponding popular string 44 of phonemes, may be associated with one or more weighting factors or scores 46. Each weighting factor or score 46 may be assigned according to any scheme for evaluating or scoring the occurrences of each popular string 44 of phonemes within the string 38 of phonemes. The most popular query terms 42, for example, and thus their corresponding popular strings 44 of phonemes, may be assigned the highest or greatest weighting factors/scores 46. Less popular query terms may have smaller weighting factors/scores, while the least popular query terms may have the lowest or least weighting factors/scores. Other schemes, of course, may be used. The indexing application 32 may even selectively ignore some factors/scores or enhance others, depending on the scheme. The indexing application 32 may even access any simple or complex mathematical formula 48 to compute each weighting or score 46. The indexing application 32 may sum the weighting factors or scores, average the factors/scores, and/or discard any weights or scores below a threshold value.

The indexing application 34 may index the video content 28, based on the audio stream 26. As the indexing application 32 computes any of the weighting factors or scores 46, any of those values may be used to classify, rank, and/or index the content 28. Recall that only the phonetic content of the audio stream 26 has been processed and analyzed. The indexing application 32 thus maps or indexes the video content 28 (stored in the media server 22), based only on an analysis of its audio content or audio portion. The indexing application 34 may thus create or populate an indexing table 50 that maps or indexes the video content 30 to its associated weighting factor(s) or overall score 46. As users query for their desired video content (such as movies), the indexing application 32 may quickly consult the table 50 to determine what content offerings best satisfy the user's query. The content having the highest weights or score(s) for the user's query may best suit the user's content desires.

A typical query helps explain the indexing of content. Suppose a query is received that contains the text "DARTH VADER." When the indexing application 32 receives the query, the indexing application 32 can immediately access the indexing table 50 for the textual phrase "DARTH VADER." Because the textual phrase "DARTH VADER" is one of the popular query terms 42, the indexing application 32 may immediately retrieve those content titles 52 having a weight or score for the textual phrase "DARTH VADER." Here, then, the indexing application 32 may immediately retrieve the title "STAR WARS" and its associated weight or score 46 (e.g., a weight or score of "10"). The indexing application may thus quickly and efficiently provide a query response, without performing a textual conversion. ("STAR WARS" and "DARTH VADER" are registered trademarks of Lucasfilm Ltd.)

Exemplary embodiments are thus faster and cheaper. Unlike conventional schemes for indexing video content, exemplary embodiments need not convert the audio stream 26 into text. Conventional schemes utilize speech recognition techniques to convert the audio stream 26 into text. That text is then used to index the video content 28. Here, however, exemplary embodiments only analyze the phonetic units contained within the audio stream 26—no text conversion is needed. The conversion from phonemes to text, as is done using conventional speech recognition techniques, is slow and requires more processing power. Exemplary embodiments, however, only determine the occurrences of popular words (or their phoneme equivalents), so the added complexity and accuracy of textual conversion is not needed. The video content 28, instead, may be indexed, based only on the total weight of popular phoneme combinations occurring within the audio stream 26.

Exemplary embodiments may be applied to any server and to any indexing application. The provider's server 20, for example, may be configured as a conventional web server or as a specially-configured streaming server. The indexing application 32 may be any software application, plug-in, and/or hardware component that processes, retrieves, or access any type of content. The indexing application 32 may even be incorporated into, or cooperate with, a search engine for finding and/or retrieving audio and/or video content. Exemplary embodiments may even be incorporated into existing media players, such as Microsoft's Media Player and Real-Network's REALPLAYER™.

The server 20 and the media server 22 are only simply illustrated. Because the architecture and operating principles of these devices are well known, the hardware and software components of the server 20 and the media server 22 are not further shown and described. If the reader desires more details, the reader is invited to consult the following sources, all incorporated herein by reference in their entirety: ANDREW TANENBAUM, COMPUTER NETWORKS ($4^{th}$ edition 2003); WILLIAM STALLINGS, COMPUTER ORGANIZATION AND ARCHITECTURE: DESIGNING FOR PERFORMANCE ($7^{th}$ Ed., 2005); and DAVID A. PATTERSON & JOHN L. HENNESSY, COMPUTER ORGANIZATION AND DESIGN: THE HARDWARE/SOFTWARE INTERFACE ($3^{rd}$. Edition 2004).

Some aspects of speech recognition and phonetic analysis are known, so this disclosure will not greatly explain the known details. If the reader desires more details, the reader is invited to consult the following sources, all incorporated herein by reference in their entirety: U.S. Pat. No. 6,076,056 to Huang et al. (Jun. 13, 2000); U.S. Pat. No. 6,408,270 to Garber (Jun. 18, 2002); U.S. Pat. No. 6,873,993 to Charlesworth et al. (Mar. 29, 2005); U.S. Pat. No. 6,882,970 to Garner et al. (Apr. 19, 2005); U.S. Pat. No. 6,990,448 to Charlesworth et al. (Jan. 24, 2006); U.S. Pat. No. 7,010,483 to Rajan (Mar. 7, 2006); U.S. Pat. No. 7,054,812 to Charlesworth et al. (May 30, 2006); Published U.S. Patent Application 2004/0215449 to Roy (Oct. 28, 2004); Published U.S. Patent Application 2006/0015339 to Charlesworth et al. (Jan. 19, 2006); Published U.S. Patent Application 2006/0053101 to Stuart et al. (Mar. 9, 2006); and Published U.S. Patent Application 2006/0053107 to Stuart (Mar. 9, 2006).

Figure 2:
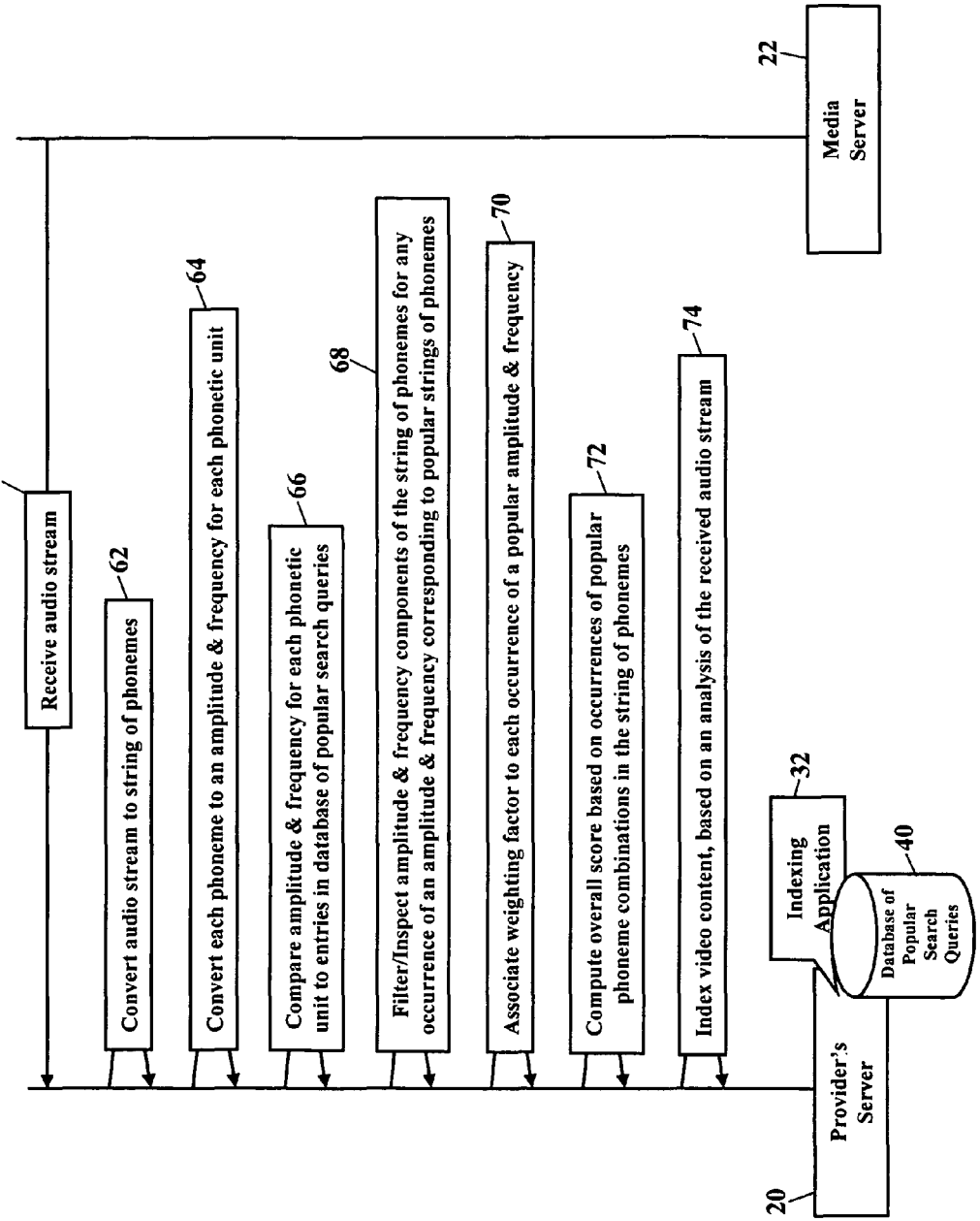
FIG. 2 is a schematic illustrating a process for indexing content, according to more exemplary embodiments.

FIG. 2 is a schematic illustrating a process for indexing content, according to more exemplary embodiments. Here audio content is indexed using amplitude and frequency of each phonetic unit. As FIG. 2 illustrates, the provider's server 20 receives the audio stream 26 from the media server 22 (Step 60). The audio stream 26 is converted to the string 38 of phonemes (Step 62). The indexing application 34, for example, may instruct the processor 32 to perform this conversion (which is known), or the indexing application 34 may instruct the processor 32 to send or communicate the audio stream 26 to another server, processor, or software application for this conversion (as is known). The indexing application 34 may additionally or alternatively perform, or instruct, a decoding operation (known and not shown). However the conversion is performed, the indexing application 34 may then convert each phoneme in the string 36 of phonemes to an amplitude and a frequency for each phonetic unit (Step 64). The indexing application 34 may compare the amplitude and frequency for each phonetic unit to entries in the database 40 of popular search queries (Step 66). Here the database 40 of popular search queries maps, indexes, or otherwise associates popular query terms, their corresponding string of phonemes, and/or their corresponding amplitude and a frequency for each phonetic unit. The most popular queries are thus mapped to their corresponding amplitude and a frequency for each phonetic unit. The indexing application 34 filters or inspects the amplitude and frequency components of the string 38 of phonemes for any occurrence of an amplitude and frequency corresponding to the popular strings 44 of phonemes (Step 68). Each occurrence of a popular amplitude and frequency (corresponding to a popular search query or a popular string of phonemes) may be associated with a weighting factor 46 (Step 70). The indexing application 32 may compute an overall weighting or score for the audio stream 26, based on the popular phoneme combinations (or their amplitude and frequency components) occurring in the string 38 of phonemes (Step 72). The indexing application 32 may map or index video content, based on an analysis of the received audio stream (Step 74). 5). The indexing application 32 may store, write, or associate the index information and/or the weights/scores as metadata.

Figure 3:
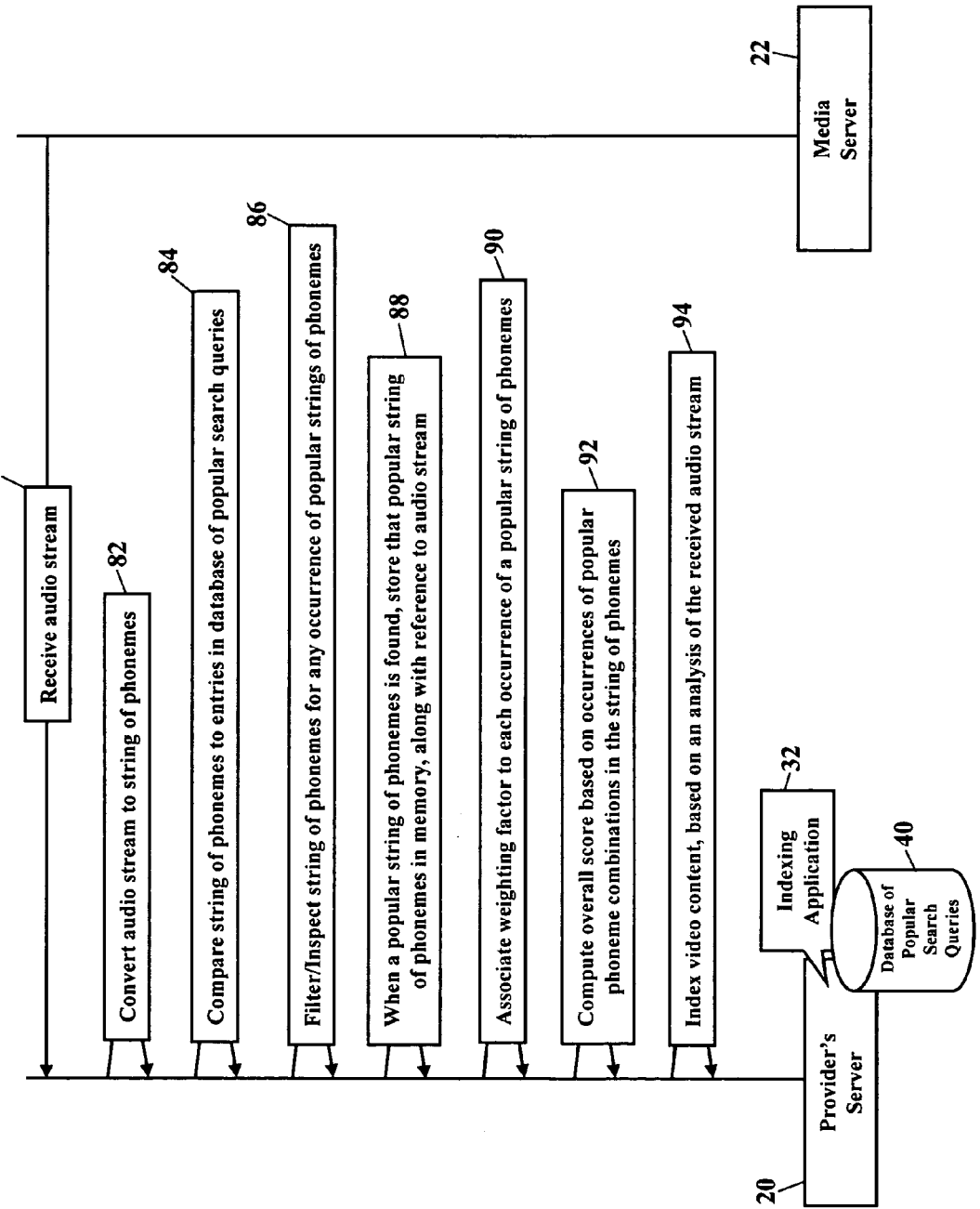
FIG. 3 is a schematic illustrating another process for indexing video content, according to even more exemplary embodiments.

FIG. 3 is a schematic illustrating another process for indexing video content, according to even more exemplary embodiments. Here the indexing application 32 determines what popular words occur in the audio stream 26. The provider's server 20 again receives the audio stream 26 from the media server 22 (Step 80), and the audio stream 26 is converted to the string 38 of phonemes (Step 82). The indexing application 34 compares the string 38 of phonemes to entries in the database 40 of popular search queries (Step 84). The database 40 of popular search queries again maps, indexes, or otherwise associates popular query terms to their corresponding string of phonemes. The processor 32 accesses the database 40 of popular search queries and filters or inspects the string 38 of phonemes for any occurrence of popular strings of phonemes (Step 86). When a popular string of phonemes is found, the indexing application 32 may store that popular string of phonemes in memory, along with a reference to the audio stream 26 (Step 88). The indexing application 32, for example, may maintain or access the indexing table (shown as reference numeral 50 in FIG. 1) that associates popular search words to content titles. The indexing table 50 associates popular string of phonemes 44 to the title 52 associated with the audio stream 26 (such as a movie title). The indexing table 50 thus maps the popular phoneme combinations 44 occurring in the string 36 of phonemes to the title 52 or other identifier of the audio stream 26. The indexing table 50 may additionally or alternatively map the textual popular word 42 to the title 52 or other identifier of the audio stream 26. Each occurrence of a popular string of phonemes may be associated with a weighting factor (Step 90), and an overall weighting or score may be computed for the audio stream 26 (Step. 92). The indexing application 32 may map or index video content, based on an analysis of the received audio stream (Step 94).

Figure 4:
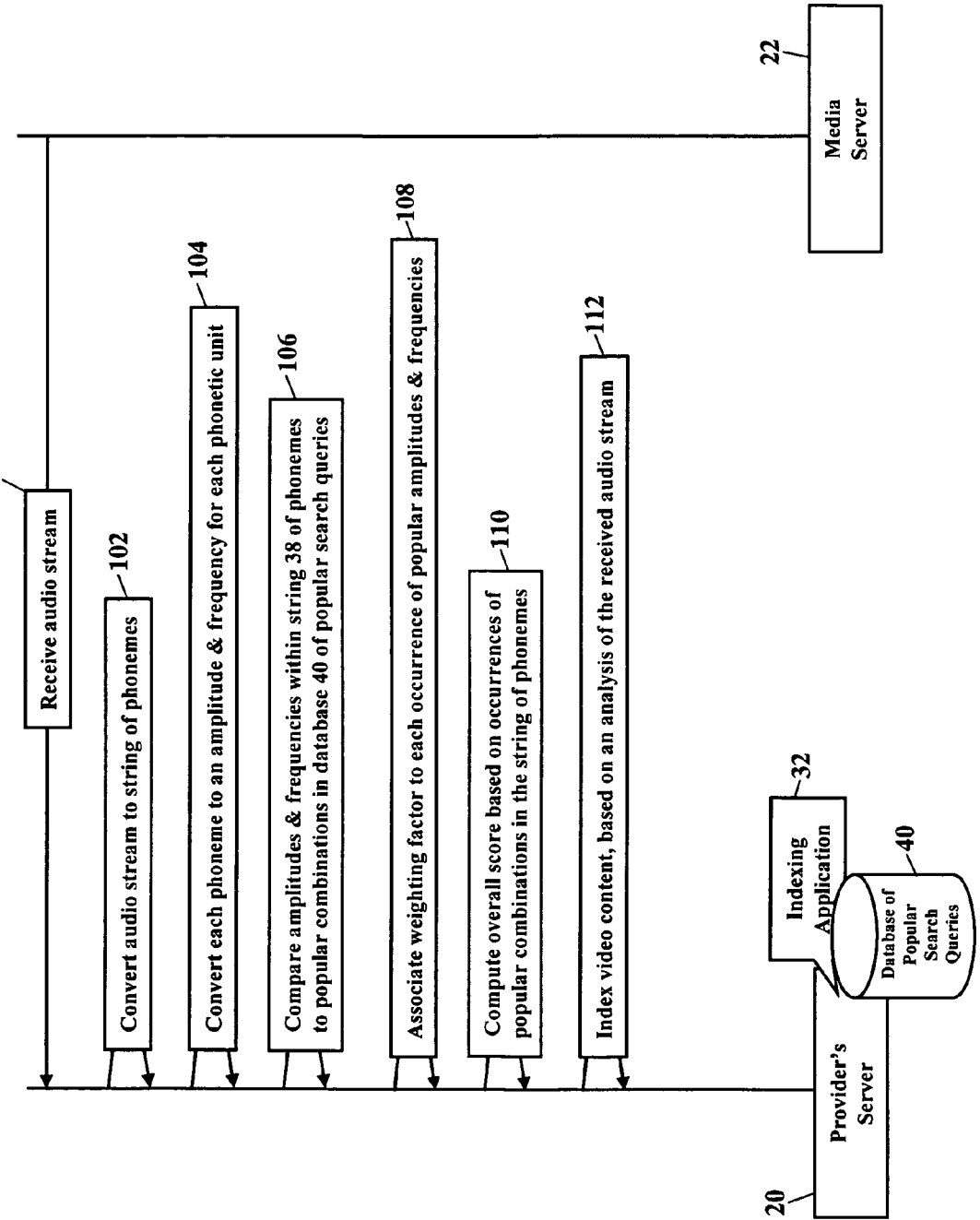
FIG. 4 is a schematic illustrating another process for indexing content, according to still more exemplary embodiments.

FIG. 4 is a schematic illustrating another process for indexing content, according to still more exemplary embodiments. Here the indexing application 32 searches audio content for the amplitude and frequency of popular phonetic combinations. The provider's server 20 again receives the audio stream 26 (Step 100), and the audio stream 26 is converted to the string 38 of phonemes (Step 102). Each phoneme is converted to its corresponding amplitude and a frequency (Step 104). The indexing application 34 compares amplitudes and frequencies within the string 38 of phonemes to popular combinations in the database 40 of popular search queries (Step 106). Here the database 40 of popular search queries again maps, indexes, or otherwise associates popular query terms, their corresponding string of phonemes, and/or their corresponding combinations of amplitudes and frequencies. The indexing application 34, for example, may statistically compare (perhaps using hidden Markov models) the amplitudes and frequencies of the most popular queries to the amplitudes and frequencies within the string 38 of phonemes. The indexing application 34 may thus filter or inspect the amplitude and frequency components of the string 38 of phonemes for any occurrence of popular amplitude and frequency combinations corresponding to the popular strings 44 of phonemes. Each occurrence of a popular combination of amplitudes and frequencies (corresponding to a popular search query or a popular string of phonemes) may be associated with a weighting factor 46 (Step 108). The indexing application 32 may compute an overall weighting or score for the audio stream 26, based on the popular phoneme combinations (or their amplitude and frequency components) occurring in the string 38 of phonemes (Step 110). The indexing application 32 may map or index video content, based on an analysis of the received audio stream (Step 112).

Content may thus be indexed based on phonemes or based on amplitude and frequency. As FIG. 3 illustrates, the indexing application 32 may determine what popular combinations of phonemes occur in the string 38 of phonemes. That is, the indexing application 34 compares the string 38 of phonemes to popular combinations of phonemes listed in the database 40 of popular search queries. FIG. 4, however, illustrates that the indexing application 34 may additionally or alternatively compare amplitudes and frequencies within the string 38 of phonemes to popular combinations of amplitudes and frequencies in the database 40 of popular search queries. The indexing application 32, therefore, may perform a phoneme analysis (as illustrated with reference to FIG. 3), and/or the indexing application 32 may compare amplitudes and frequencies of phonetic combinations. Either technique permits indexing of content without a slow and costly speech-to-text conversion.

Figure 5:
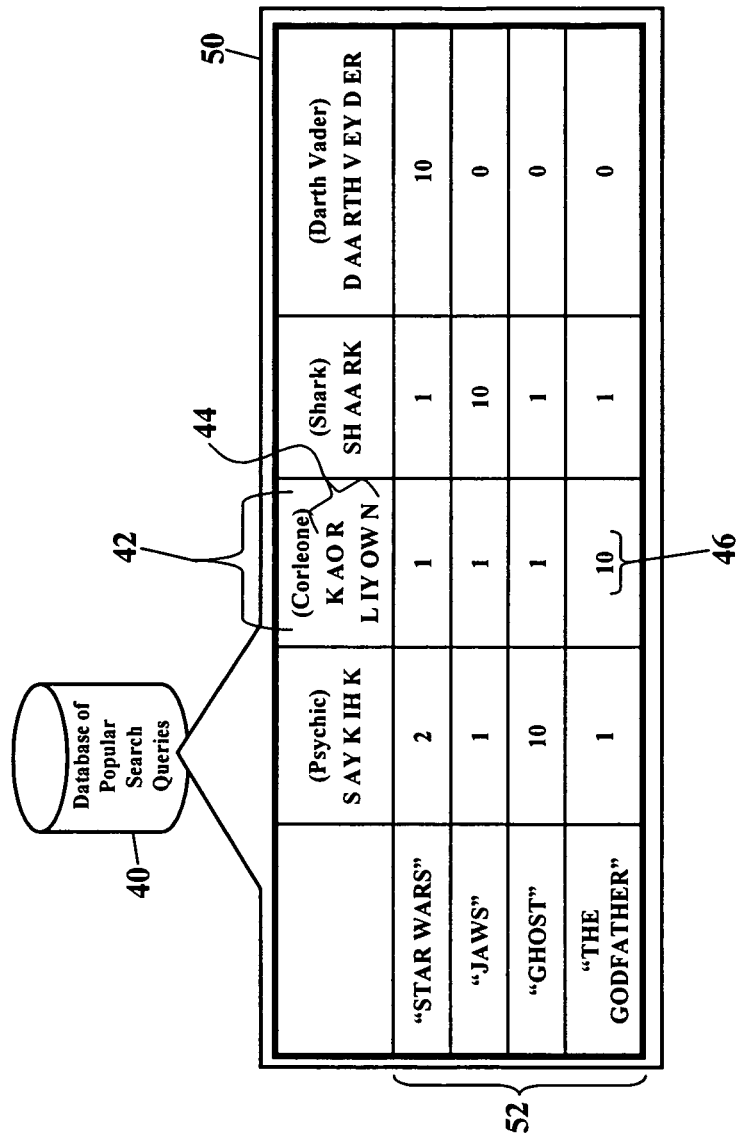
FIG. 5 is a schematic illustrating an indexing table, according to yet more exemplary embodiments.

FIG. 5 is another schematic illustrating the indexing table 50, according to yet more exemplary embodiments. Here the indexing table 50 provides a detailed association between any content and its corresponding audio portion. The indexing table 50 may be quickly accessed to determine what content best suits a user's content query, again without performing a conventional speech-to-text conversion. Once the indexing application 32 filters or inspects the string 38 of phonemes for any occurrence of popular strings of phonemes, or for popular combinations of amplitudes and frequencies (as shown and explained with reference to FIGS. 1-4), the indexing application 32 populates the indexing table 50. The indexing table 50 may associate the title 52 or other identifier of the audio stream (shown as reference numeral 26 in FIGS. 1-4) to the popular search words or phrases 42. The indexing table 50 may additionally or alternatively associate the title 52 of the audio stream to the corresponding popular strings 44 of phonemes. The indexing table 50 may additionally or alternatively associate the weight or score 46 corresponding to each popular query. The indexing table 50, then, may be quickly accessed to determine what content best satisfies a user's content query. When a user submits a query for content, that query may be parsed for any occurrence of the popular search words or phrases 42. The indexing table 50 may then be accessed or queried for those titles 52 having the highest/greatest weight or score 46 corresponding to the popular search word or phrase 42. Note, then, that content is indexed without a slow and costly text conversion, as is done using conventional speech recognition techniques.

Suppose a user queries for the term "DON CORLEONE." The indexing application (shown as reference numeral 32 in FIGS. 1-4) parses the user's query for any occurrence of a popular search term. As FIG. 5 illustrates, the term "Corleone" is one of the popular query terms 42. The indexing application 32 thus queries or accesses the indexing table 50 and may immediately retrieve those content titles 52 having a weight or score for the textual phrase "CORLEONE." The indexing application 32 may thus retrieve all the content titles having a weight or score 46 for the popular textual phrase "CORLEONE." If the indexing application is configured to ignore any content titles having a weight or score 46 below a threshold value of "6," then the indexing application only retrieves the content title "THE GODFATHER." The indexing application has thus provided a query response without a slow and costly conventional speech-to-text conversion.

Exemplary embodiments may also include language capabilities. The indexing application 32 may analyze and index content having different or multiple language tracks. Some movies, for example, have English, Spanish, French, and German language tracks. The indexing application 32 may convert any of these language tracks to a string of phonemes in any language model. The indexing application 32 may then index and search content, as explained above, using any language format. Moreover, if the indexing application 32 analyzes multiple language tracks for the same content, the indexing application 32 may have a higher verification or probability of identifying search criteria. The database 40 of popular search queries, for example, could map popular search terms in multiple languages (e.g., Spanish and English). The indexing application 32 may then query for English terms and their corresponding phonemes and query for the equivalent Spanish terms and the Spanish phonemes. This multiple language or audio format matching creates a better content index for a bigger population of subscribers/users.

Exemplary embodiments may also exhibit a linear efficiency. When the indexing application 32 performs a search, the mathematical efficiency of the search algorithm may be linear or nearly linear. The search algorithm, for example, may utilize the formula $O(M*N)$, where M is a constant number of most popular phoneme strings and N is the number of converted phonemes in the audio stream. Conventional voice recognition techniques require at least $O(N^2)$.

Figure 6:
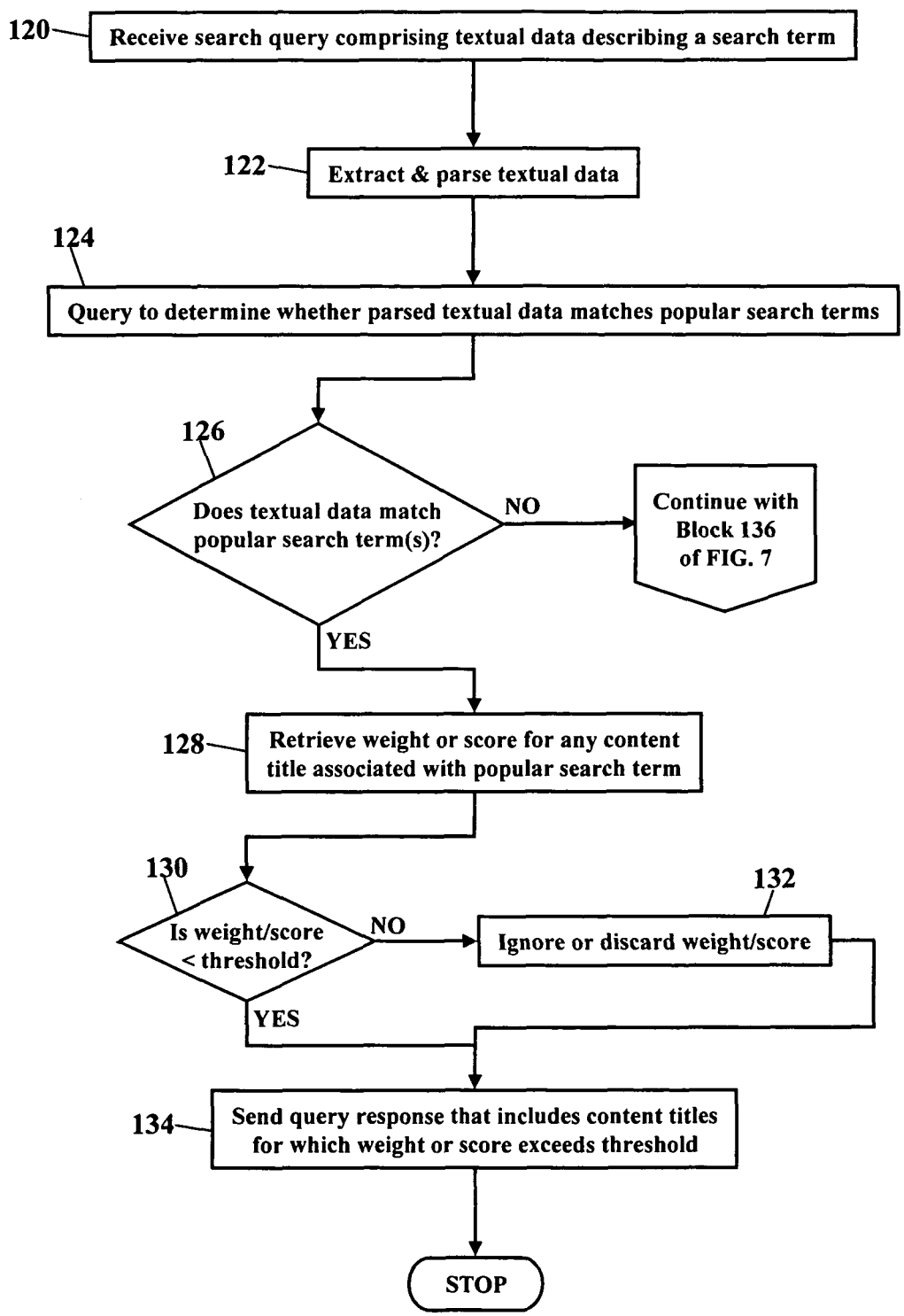
FIGS. 6 and 7 are flowcharts illustrating a method for indexing content, according to exemplary embodiments.
Figure 7:
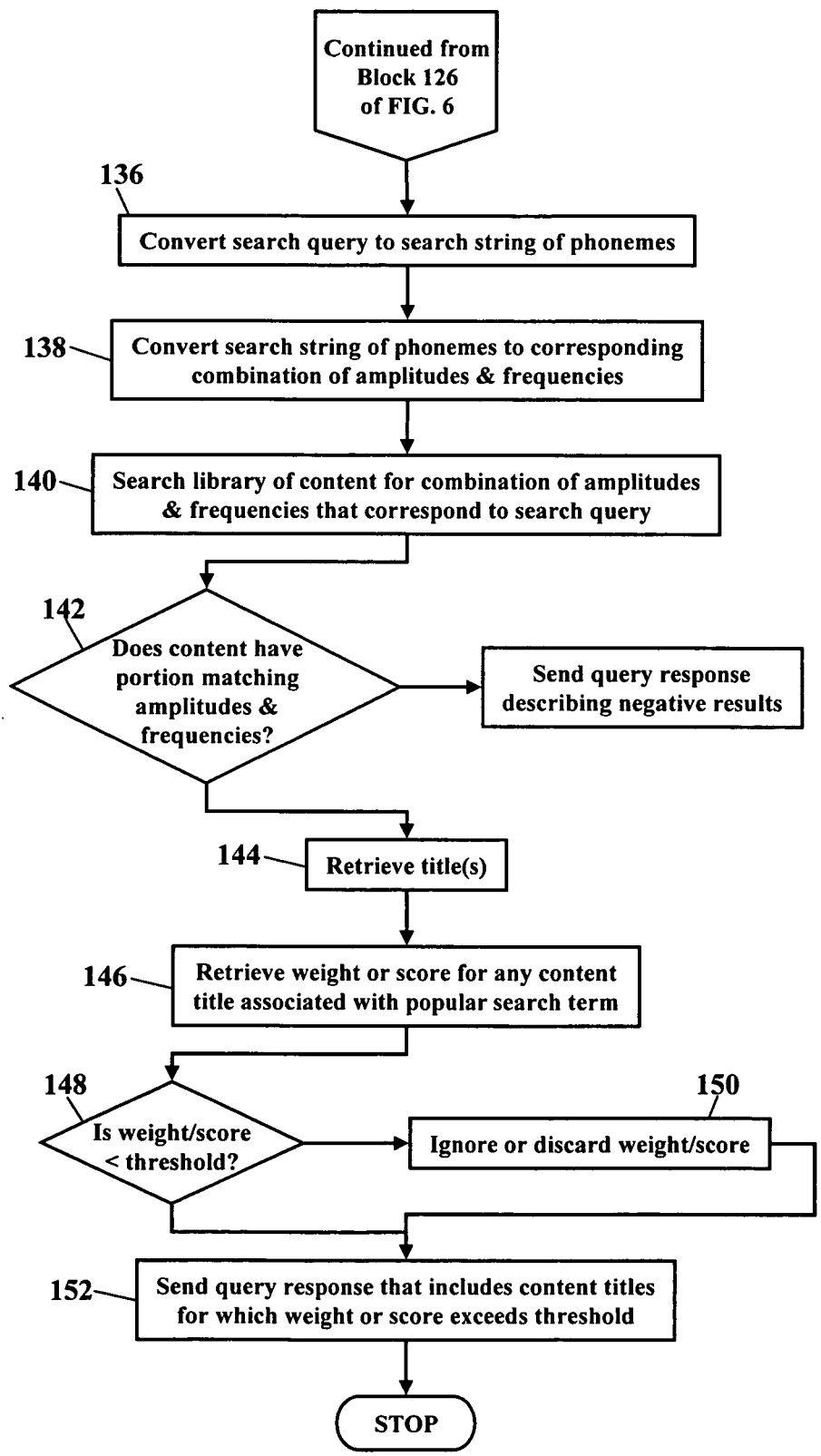

FIGS. 6 and 7 are flowcharts illustrating a method for indexing content, according to exemplary embodiments. Here a search query is received that comprises textual data describing a search term (Block 120). The textual data is extracted and parsed (Block 122). A query is then made to determine whether the parsed textual data matches popular search terms (Block 124). If a match is found (Block 126), a weight or score is retrieved for any content title associated with the popular search term (Block 128). If the weighting or score is less than a threshold value (Block 130), then the weight or score is ignored or discarded (Block 132). A query response is then sent, and the query response includes the content titles for which the weight or score exceeds the threshold (Block 134).

Sometimes, however, the search query may not contain popular search terms. When the search query is extracted and parsed (Block 122), the parsed textual data may not match the popular search terms (Block 126). As FIG. 7 illustrates, the search query is converted to a search string of phonemes (Block 136), and the search string of phonemes is then converted to a corresponding combination of amplitudes and frequencies (Block 138). A library of content is then searched for the combination of amplitudes and frequencies that correspond to the search query (Block 140). If a match is found (Block 142), a title is retrieved (Block 144). A weight or score may also be retrieved (Block 146). If the weighting or score is less than the threshold value (Block 148), then the weight or score is ignored or discarded (Block 150). A query response is then sent, and the query response includes the content titles for which the weight or score exceeds the threshold (Block 152).

Figure 8:
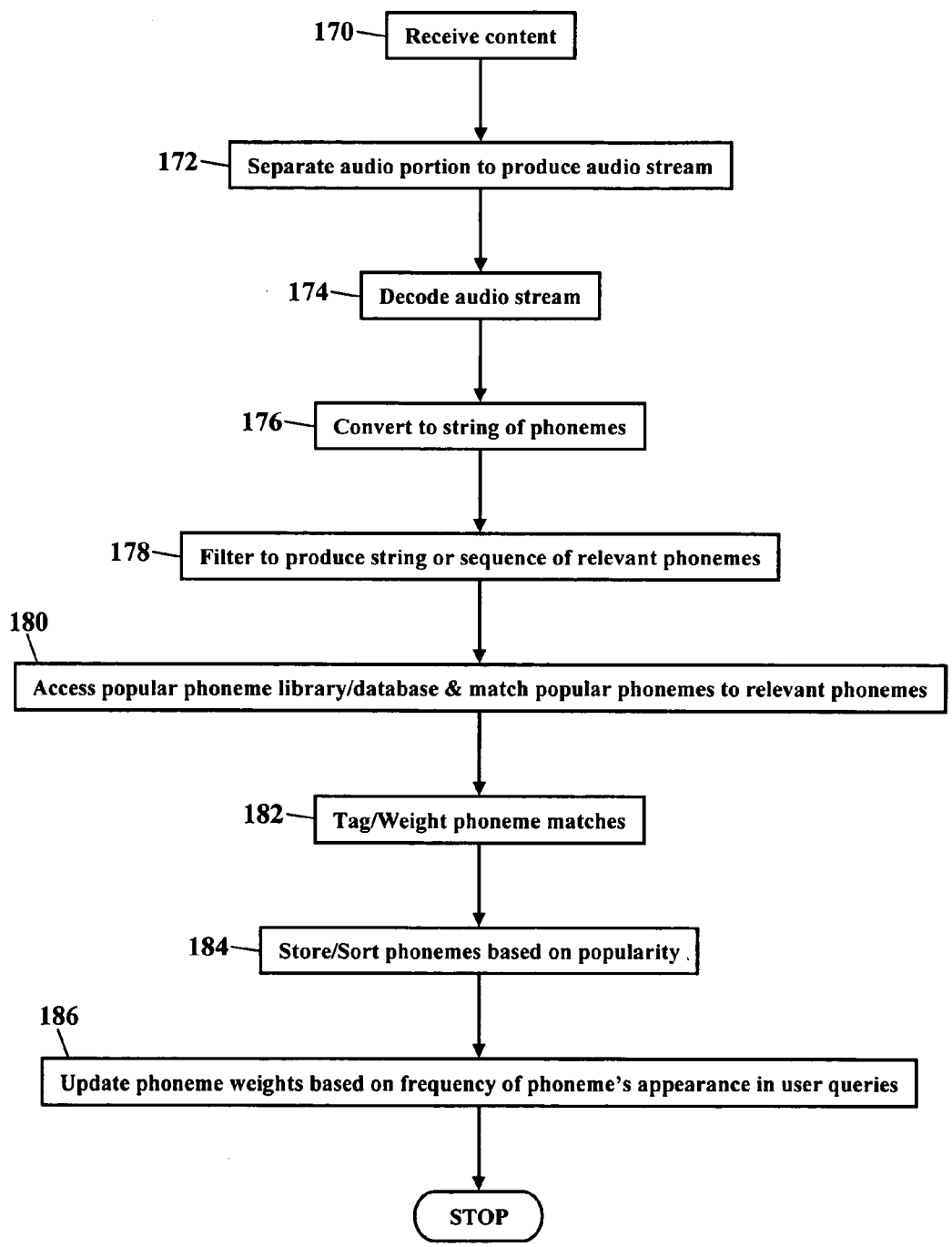
FIG. 8 depicts other possible operating environments for additional aspects of the exemplary embodiments.

FIG. 8 is a flowchart illustrating another method for indexing content, according to more exemplary embodiments. Here, "raw" content is received, processed, and indexed, based on its audio content. The term "raw" content means any content that has not been previously indexed. That is, the indexing application 32 has not previously analyzed and processed the content's audio content. As FIG. 8 illustrates, the raw video, music, movie, or other content is received (Block 170). The audio portion, track, or content is split, filtered, or otherwise separated from the video portion of the content to produce the audio stream (Block 172). The audio stream may then be decoded, if needed (Block 174). The audio stream is converted to a string of phonemes, perhaps by using speech recognition techniques (Block 176). The string of phonemes may be filtered to produce a string or sequence of relevant phonemes (Block 178). Some phoneme combinations, such as phonemes for the words "of," "is," "the," or "and," may have a low probability of search interest. The indexing application 32, then, may filter or remove phoneme combinations that may not be relevant to the search to simplify processing and indexing. A popular phoneme library or database is accessed to match popular phonemes to the relevant phonemes (Block 180). Any matches may then be tagged and/or weighted (Block 182). Phonemes may be stored and sorted or ranked based on popularity (Block 184). Any weight of a phoneme may be updated based on a frequency of that phoneme's appearance in user queries (Block 186). 2). Once the audio content is weighted and indexed, the weight and/or the index may be associated with (or written back) to the video content as part of metadata. Thus, the original raw video content is self-contained searchable video.

Figure 9:
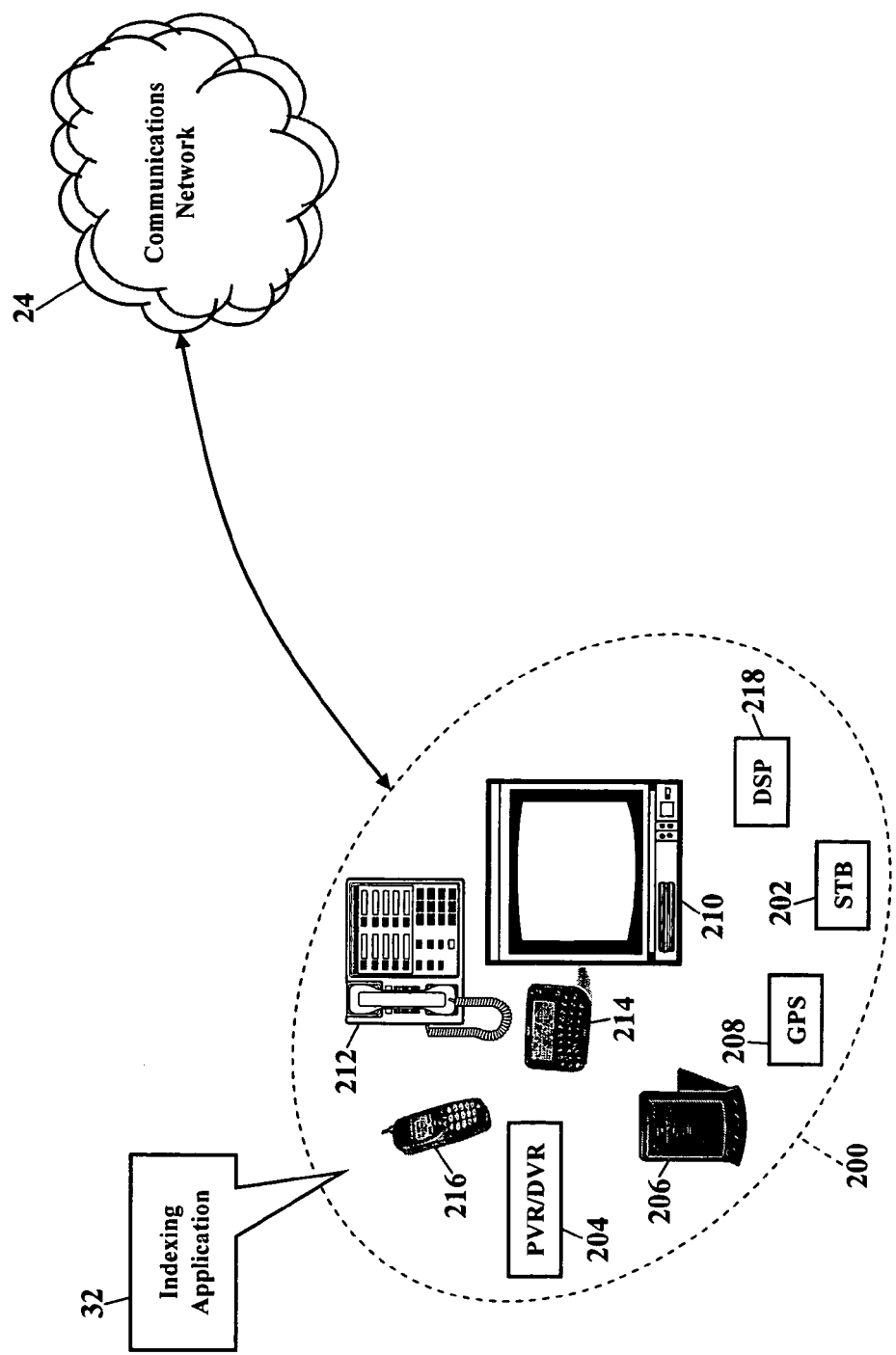
FIG. 9 depicts other possible operating environments for additional aspects of the exemplary embodiments.

FIG. 9 depicts other possible operating environments for additional aspects of the exemplary embodiments. FIG. 9 illustrates that the indexing application 32 may alternatively or additionally operate within various other communications devices 200. FIG. 9, for example, illustrates that the indexing application 32 may entirely or partially operate within a set-top box (202), a personal/digital video recorder (PVR/DVR) 204, personal digital assistant (PDA) 206, a Global Positioning System (GPS) device 208, an interactive television 210, an Internet Protocol (IP) phone 212, a pager 214, a cellular/satellite phone 216, or any computer system and/or communications device utilizing a digital signal processor (DSP) 218. The communications device 200 may also include watches, radios, vehicle electronics, clocks, printers, gateways, and other apparatuses and systems. The devices illustrated in FIG. 9 may also initiate an indexing of content, as explained herein above. Because the architecture and operating principles of the various communications devices 200 are well known, the hardware and software componentry of the various communications devices 200 are not further shown and described. If, however, the reader desires more details, the reader is invited to consult the following sources, all incorporated herein by reference in their entirety: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment (Subscriber Identity Module—ME) interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, iTV HANDBOOK: TECHNOLOGIES AND STANDARDS (2004).

The indexing application 32 may be physically embodied on or in a computer-readable media or medium. This computer-readable media/medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the exemplary embodiments, allow the present invention to be easily disseminated. A computer program product comprises the indexing application 32 stored on the computer-readable media or medium. The indexing application 32 comprises computer-readable instructions/code for indexing content, as hereinabove explained. The indexing application 32 may also be physically embodied on or in any addressable (e.g., HTTP, I.E.E.E. 802.11, Wireless Application Protocol (WAP), or BLUETOOTH®) wireless device capable of presenting an IP address.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:
1. A method of indexing content, comprising:
  receiving video content comprising an audio stream;
  converting the audio stream to a string of phonemes;

converting each phoneme in the string of phonemes to an amplitude and a frequency component for each phonetic unit;
storing associations in a database between popular text search queries and corresponding popular amplitudes and frequencies;
inspecting amplitude and frequency components corresponding to the string of phonemes for each occurrence of a popular amplitude and frequency corresponding to a popular text query;
retrieving a score for each popular amplitude and frequency component found in the amplitude and frequency components corresponding to the string of phonemes;
summing each score of each occurrence of the popular amplitude and frequency component to obtain a total score for the audio stream;
storing associations in the database between titles of video content to total scores for audio streams;
adding an entry in the database that associates a title of the video content to the total score for the audio stream;
receiving a text query;
querying the database for the text query and a threshold score;
retrieving the titles of video content matching the text query and having the total score at least equal to the threshold score; and
responding to the text query with the titles of video content.

2. The method according to claim 1, further comprising accessing a database of popular search queries and retrieving a search string of phonemes corresponding to a popular search query.

3. The method according to claim 1, further comprising storing popular phoneme combinations occurring in the string of phonemes.

4. The method according to claim 3, further comprising:
associating the popular phoneme combinations occurring in the string of phonemes to popular words; and
indexing the popular words to the content.

5. The method according to claim 4, further comprising:
converting the text query to the string of phonemes; and
comparing the string of phonemes corresponding to the text query to an index of popular phoneme combinations.

6. A system of indexing content, comprising:
a processor;
memory; and
code stored in the memory that causes the processor at least to perform operations, the operations comprising:
receive video content comprising an audio stream;
convert the audio stream to a string of phonemes;
convert each phoneme in the string of phonemes to an amplitude and a frequency component for each phonetic unit;
store associations in a database between popular text search queries and corresponding popular amplitudes and frequencies;
inspect amplitude and frequency components corresponding to the string of phonemes for each occurrence of a popular amplitude and frequency corresponding to a popular text query;
retrieve a score for each popular amplitude and frequency component found in the amplitude and frequency components corresponding to the string of phonemes;
sum each score of each occurrence of the popular amplitude and frequency component to obtain a total score for the audio stream;
store associations in the database between titles of video content to total scores for audio streams;
add an entry in the database that associates a title of the video content to the total score for the audio stream;
receive a text query;
query the database for the text query and a threshold score;
retrieve the titles of video content matching the text query and having the total score at least equal to the threshold score; and
respond to the text query with the titles of video content.

7. The system according to claim 6, wherein the code further causes the processor to access a database of popular search queries and convert each popular search query to a search string of phonemes.

8. The system according to claim 6, wherein the code further causes the processor to store in the memory popular phoneme combinations occurring in the string of phonemes.

9. The system according to claim 6, wherein the code further causes the processor to:
associate popular phoneme combinations occurring in the string of phonemes to popular words; and
index the popular words to the content.

10. The system according to claim 9, wherein the code further causes the processor to:
compare the text query to an index of popular words.

11. The system according to claim 9, wherein the code further causes the processor to:
convert the text query to a search string of phonemes; and
compare the search string of phonemes to an index of popular phoneme combinations.

12. A non-transitory computer readable medium storing computer-readable instructions for performing a method, the method comprising:
receiving video content comprising an audio stream;
converting the audio stream to a string of phonemes;
converting each phoneme in the string of phonemes to an amplitude and a frequency component for each phonetic unit;
storing associations in a database between popular text search queries and corresponding popular amplitudes and frequencies;
inspecting amplitude and frequency components corresponding to the string of phonemes for each occurrence of a popular amplitude and frequency corresponding to a popular text query;
retrieving a score for each popular amplitude and frequency component found in the amplitude and frequency components corresponding to the string of phonemes;
summing each score of each occurrence of the popular amplitude and frequency component to obtain a total score for the audio stream;
storing associations in the database between titles of video content to total scores for audio streams;
adding an entry in the database that associates a title of the video content to the total score for the audio stream;
receiving a text query;
querying the database for the text query and a threshold score;
retrieving the titles of video content matching the text query and having the total score at least equal to the threshold score; and
responding to the text query with the titles of video content.

13. The computer readable medium according to claim 12, further comprising instructions for accessing a database of popular search queries and converting each popular search query to a search string of phonemes.

14. The computer readable medium according to claim 13, further comprising instructions for converting the search string of phonemes to amplitudes and frequencies.

15. The computer readable medium according to claim 12, further comprising instructions for storing in memory popular phoneme combinations.

16. The computer readable medium according to claim 15, further comprising instructions for:
 associating the popular phoneme combinations to popular words; and
 indexing the popular words to the content.

17. The computer readable medium according to claim 16, further comprising instructions for:
 receiving a search query comprising text data; and
 comparing the text query data to an index of popular words.

\* \* \* \* \*